United States Patent
Walter et al.

(10) Patent No.: US 11,942,883 B2
(45) Date of Patent: Mar. 26, 2024

(54) METHOD OF CONTROLLING A DRIVE MOTOR

(71) Applicant: Schneider Electric Industries SAS, Rueil-Malmaison (FR)

(72) Inventors: Sebastian Walter, Marktheidenfeld/Altfeld (DE); Dirk Hempel, Assamstadt (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 550 days.

(21) Appl. No.: 16/903,626

(22) Filed: Jun. 17, 2020

(65) Prior Publication Data

US 2020/0395879 A1    Dec. 17, 2020

(30) Foreign Application Priority Data

Jun. 17, 2019   (EP) .................................... 19180605

(51) Int. Cl.
*H02P 23/00*   (2016.01)
*G05B 19/418*   (2006.01)

(52) U.S. Cl.
CPC .... *H02P 23/0022* (2013.01); *G05B 19/41885* (2013.01); *G05B 2219/41434* (2013.01)

(58) Field of Classification Search
None
See application file for complete search history.

(56) References Cited

U.S. PATENT DOCUMENTS

| | | |
|---|---|---|
| 2003/0195641 A1 | 10/2003 | Wojsznis et al. |
| 2004/0181380 A1 | 9/2004 | Yoshida et al. |
| 2007/0021850 A1 | 1/2007 | Wojsznis et al. |
| 2009/0160389 A1* | 6/2009 | Denk ..................... G05B 19/19 318/573 |
| 2014/0117919 A1 | 5/2014 | Ikeda et al. |
| 2015/0355647 A1* | 12/2015 | Bitterolf ................ B25J 9/1638 700/275 |
| 2016/0070248 A1 | 3/2016 | Besselmann |
| 2016/0144508 A1 | 5/2016 | Nakajima |
| 2018/0297196 A1 | 10/2018 | Nakajima |

(Continued)

FOREIGN PATENT DOCUMENTS

| | | |
|---|---|---|
| DE | 43 18 923 C2 | 10/2002 |
| DE | 10 2004 019 352 A1 | 11/2005 |
| DE | 10 2010 034 590 A1 | 2/2012 |

(Continued)

OTHER PUBLICATIONS

European Search Report dated Nov. 26, 2019 in corresponding European Patent Application No. 19180605.8, 11 pages.

(Continued)

*Primary Examiner* — Sean Shechtman
(74) *Attorney, Agent, or Firm* — Oblon, McClelland, Maier & Neustadt, L.L.P.

(57) ABSTRACT

A method of controlling a drive, in particular an electric drive, of an industrial machine, in which method a drive control controls a drive motor and the drive motor drives a mechanical system having one or more coupled components. The drive control carries out a simulation of the mechanical system of the machine with a simulation model and performs a feedforward control of the drive motor based on the simulation.

16 Claims, 3 Drawing Sheets

(56) References Cited

U.S. PATENT DOCUMENTS

2020/0218207 A1* 7/2020 Egi .................. G05B 19/058

FOREIGN PATENT DOCUMENTS

Figure 1:
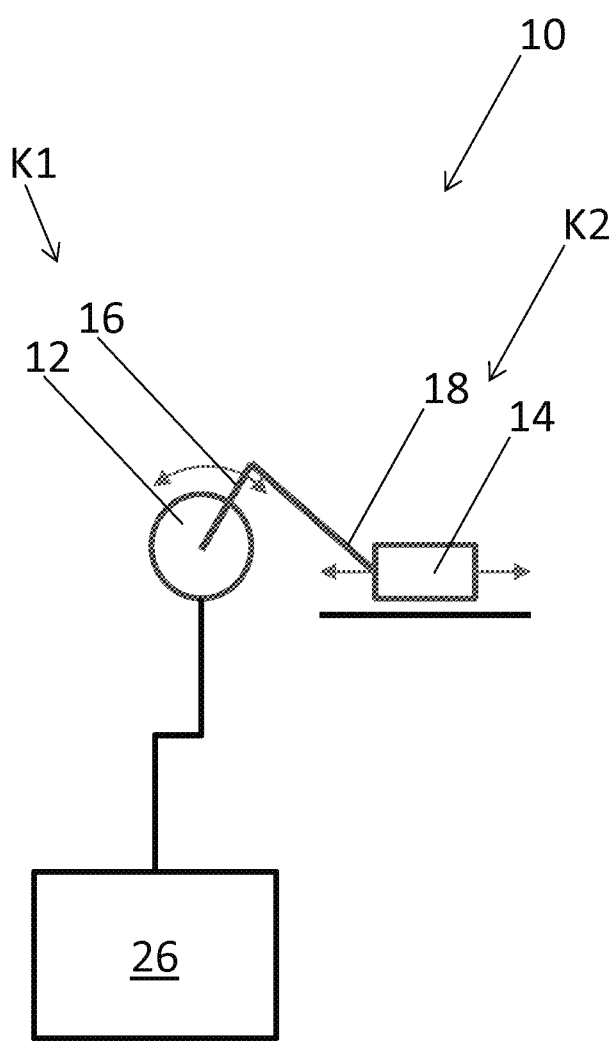

| DE | 11 2009 003 699 B4 | 6/2015 |
| DE | 11 2012 007 053 B4 | 8/2017 |
| EP | 1 934 660 B1 | 3/2010 |
| EP | 2 690 513 A1 | 1/2014 |
| EP | 2 954 986 A1 | 12/2015 |
| EP | 3 023 208 A1 | 5/2016 |
| EP | 2 264 421 B1 | 11/2016 |
| JP | 2005-316937 A | 11/2005 |
| JP | 4123333 B2 | 7/2008 |
| WO | WO 01/73581 A2 | 10/2001 |
| WO | WO 2014/183930 A1 | 11/2014 |

OTHER PUBLICATIONS

Dessaint, Louis-A. et al., "An Adaptive Controller for a Direct-Drive Scara Robot: Analysis and Simulation", Signal Processing and System Control, Factory Automation. Pacific Grove, [Proceedings of the Annual Conference of the Industrial Electronics Society, (IECON)], XP10038172, Nov. 27, 1990, pp. 414-420.

Notice of Opposition dated Oct. 5, 2022, in corresponding European Patent Application No. 19180605.8 (with English Translation), 45 pages.

Matthias Kurze: "Model-based control of robots with elastic joints without sensors on the side", TU Munchen, Dissertation, 2008, 174 pages (with English Abstract).

Moritz Schappler: "Design of an Adaptive Feedforward Control for Mechatronic Systems Based on Differential Flatness", Master Thesis M-04/14-434, University of Hannover, 2014, 108 pages.

* cited by examiner

METHOD OF CONTROLLING A DRIVE MOTOR

The present invention relates to a method of controlling a drive motor, in particular an electric drive motor, of an industrial machine, in which method a drive control controls the drive motor and the drive motor drives a mechanical system of the machine having one or more coupled components.

Electric drive motors are usually used in industrial machines and drive different axles of the machine. Components of the mechanical system are in turn driven by the axles, whereby the machine performs its task in operation.

Respective different rotational speeds and torques may be required by the drive motor in the operation of the machine. For example, the different torques may be due to a reaction to a high friction that occurs for a short time or to an acceleration of one of the components of the mechanical system. After such an event has occurred, the drive control reacts and, for example, correspondingly adapts the motor current or the motor power. Nevertheless, the synchronization and the smooth running of the motor can be impaired by such events, whereby unwanted forces can occur in the mechanical system.

It is the underlying object of the invention to provide a method of controlling a drive motor which reduces or prevents the occurrence of synchronization disturbances and/or additional forces in the mechanical system.

This object is satisfied in accordance with the invention by a method in accordance with claim 1.

The object is in particular satisfied in that the drive control carries out a simulation of the mechanical system of the machine by means of a simulation model and performs a feedforward control (i.e. a pilot control or pre-control) of the drive motor based on the simulation.

The invention is based on the recognition that the movement of the mechanical system can be simulated in advance by the simulation model of the mechanical system. Increased torque demands can then e.g. be determined in advance in the simulation. If such an increased torque demand is recognized, a feedforward control of the drive motor can take place so that the increased torque demand does not bring about any negative effects on the smooth running of the motor or so that no unwanted additional forces occur in the mechanical system which e.g. increase the wear of the mechanical system.

The drive control can in particular carry out a feedforward control by means of the (theoretical) values calculated in the simulation. The theoretically determined values can be adapted/improved by a comparison with the (real) values actually measured at the machine. In particular due to a repeated comparison of the theoretical values with the real values, tendencies can be determined over the life time of an industrial machine that allow conclusions on mechanical changes. Models can thus be developed which enable predictions as to which mechanical components are or may be increasingly prone to error and/or wear in the future.

In accordance with the invention, the simulation is carried out by the drive control itself (i.e. not by an external system) so that no additional components are necessary. A further advantage of the carrying out of the simulation in the drive control itself is that the data obtained in the simulation can be further processed directly by the drive control and can be used for the feedforward control of the drive motor.

The drive control can in particular comprise a processing device, for example a programmable logic controller (PLC), which carries out the simulation and e.g. stores the simulation model. In addition, the drive control can comprise power components, in particular power transistors, which electrically control the drive motor. The drive control can preferably be directly connected to the drive motor, e.g. by means of electrical connection lines. The components of the drive control can in particular be accommodated in a single housing.

The drive control can be accommodated in the industrial machine. In the machine, the drive motor drives the mechanical system, wherein the mechanical system comprises one or more coupled components. Coupled is in this respect to be understood as mechanically and/or drive-effectively coupled. The drive motor can be one of the components of the mechanical system. For example, the drive motor can drive a drive axle, wherein the drive axle can again be coupled to a plurality of further components, e.g. connecting rods, gears and the like. The components of the mechanical system, that is, for example the drive axle, the connecting rods, the gears and the like, can now be stored in accordance with the data and/or simulated in the simulation model.

The drive control can also control a plurality of drive motors which in turn drive separate drive axles. The plurality of drive motors and axles can be covered by the simulation model or can be reproduced in separate simulation models.

Advantageous further developments of the invention can be seen from the description, from the drawings and from the dependent claims.

In accordance with a first advantageous embodiment, the simulation model comprises information on the structure of the mechanical system. The information on the structure of the mechanical system is used in the simulation. The information can, for example, comprise the number of components, the mass, the moment of inertia, the position, etc. of at least one or even of all of the components.

In accordance with a further advantageous embodiment, the simulation model comprises at least one transfer function which describes the behavior of at least some of the components of the mechanical system. More precisely, the transfer function can describe the movement of a first component in dependence on the movement of a second component which is coupled to the first component. Due to the transfer function, it is, for example, possible with the simulation model to draw conclusions on the movement of a component coupled directly or indirectly to the drive motor from a known rotation/movement of the motor and to calculate the movement of the component coupled to the drive motor. For example, the drive motor can move a slide back and forth via a crank rod. For this purpose, the simulation model can comprise a corresponding transfer function so that e.g. the instantaneous position, speed and acceleration of the slide can be determined/calculated from the angular position, the angular speed and/or the angular acceleration of the motor (or of the motor shaft).

Moreover, the simulation model can also comprise further transfer functions which indicate the movement of further components. A chain of transfer functions for describing the movement of all the components of the mechanical system can in particular be covered by the simulation model. All the components of the mechanical system can in particular be at least indirectly coupled to one another so that the movement of one component of the mechanical system results in movements of (all) further components of the mechanical system.

In accordance with a further advantageous embodiment, the simulation model comprises a representation, in particular a respective separate, in particular virtual (data-based) representation, of the components of the mechanical system (or even of all the components of the mechanical system), wherein the representation is preferably recalculated repeatedly. The representation of a component in the simulation model can, for example, comprise one value or a plurality of values of the component which describe physical quantities such as the speed v, the acceleration a, the position s, the mass m, the moment of inertia J, the angular acceleration a, the angular speed w and/or the friction R of the component. The movement of at least one or more components can in particular be calculated during the simulation on the basis of the simulation model, preferably on the basis of one of the aforementioned values. The movement and/or the representation of the movement in the simulation model can in this respect be recalculated repeatedly, for example every 0.5 seconds, every 0.1 seconds, every 0.01 seconds or every 0.001 seconds.

In accordance with a further advantageous embodiment, the simulation model is created on the basis of a secondary simulation model and/or is supplied with data from the secondary simulation model. The secondary simulation model can be generated and executed outside the drive control. The secondary simulation model is in particular more comprehensive and more accurate than the simulation model in the drive control. For example, the secondary simulation model can be created and/or executed using software such as industrialPhysics.

In accordance with a further advantageous embodiment, the simulation model or the secondary simulation model comprises a digital twin of the machine. The digital twin can, for example, be created with the aid of software such as industrialPhysics on the basis of the design of the machine. The digital twin can be a digital model of the machine which is available during the total life cycle of the machine. The digital twin or also the simulation model and/or the secondary simulation model can be generated from a machine project so that the creation is only associated with little effort. The machine project can be a project from project planning software (e.g. CAD software) for the machine. The function and arrangement of the components can each be defined and represented in the project planning software.

In the simulation, mathematical calculations are in particular carried out based on the simulation model by the drive control.

In accordance with a further advantageous embodiment, the simulation model and/or the secondary simulation model is/are created from a CAD model of the machine, as already mentioned above. The creation of the simulation model can hereby be simplified and accelerated since a great deal of the data or all the data for the machine are already present in the CAD model and thus only have to be transferred into the simulation model. The transfer into the simulation model can be performed by a predefined transformation algorithm. The CAD model can in particular be a three-dimensional model of the machine.

In accordance with a further advantageous embodiment, the simulation is preferably carried out in real time during the operation of the machine. In this connection, in real time means that the simulation takes place at least exactly as fast as the actual operation of the machine. The simulation can in particular in each case simulate the state of the machine since every mechanical state of the simulation is known. The necessary feedforward control of the drive motor can thus be determined and performed in real time. For example, it can be recognized in the simulation that an increased load will soon be applied to the drive motor. In the course of the feedforward control, the torque delivered by the drive motor to the mechanical system can then be increased in good time.

The simulation can in particular calculate the actual state of the machine in real time and/or can be ahead of the actual state, in particular by at least 10 ms, or by at least 5 ms, or by at least 1 ms, for example, by at most 100 ms. In addition, the simulation can be synchronized with the actual state of the machine, in particular by measuring the actual torque requirement of the drive motor. For example, the speed v, the acceleration a, the position s, the angular acceleration a, the angular speed w and/or the angular position x of one or more components can be determined by means of the transfer function of the mechanical system. In addition, it is in this respect possible by the measured torque requirement to determine mechanical parameters such as the mechanical moment of inertia, the speed-dependent friction and/or the static friction of one or all of the components of the mechanical system, as is explained in EP 19180500.1.

A force requirement and/or torque requirement necessary in the future or a force requirement and/or torque requirement of the drive motor expected in real time can therefore be calculated in the simulation. The feedforward control can then take place in accordance with the calculated force requirement and/or torque requirement.

In accordance with a further advantageous embodiment, the simulation is carried out using the program code of the drive control. This means that the simulation is carried out from the code which is also used for the regular control of the drive motor by the drive control. For example, the simulation model can be stored in a library of the code of the drive control. The necessity of separate software for the simulation of the machine is thereby dispensed with. In addition, the data generated in the simulation can be further processed in the same program code and can be used for the feedforward control of the machine. The feedforward control can hereby be implemented in a very simple manner and is also only subject to low latencies since no data transmission is necessary between different control units or similar.

In accordance with a further advantageous embodiment, the drive control is divided into a head control and a motor control, with the simulation and the feedforward control being carried out by the head control. For example, the head control can be formed by the aforementioned PLC, whereas the motor control is formed by a power part (having the aforementioned power transistors) of the drive control. The motor control can, for example, receive position requirements and/or rotational speed requirements and/or torque requirements from the head control and implement them. The motor control can, for example, comprise a PID controller for this purpose.

In accordance with a further advantageous embodiment, the simulation can be used for designing and/or selecting the motor, with the simulation in particular being executed in the drive control before the putting into operation of the machine. A torque demand for the drive motor can, for example, be determined by the simulation for every possible operating state of the machine before the putting into operation or even before the design of the machine. A suitable design and/or selection of the drive train (combination of drive control, motor and gear) is/are then thereby possible. It is therefore of advantage that the required performance or size of the drive train, in particular in machines having a complex mechanical system, can be selected based on the simulation on the basis of reliable data. Drive trains or drive motors that are dimensioned too large and are thus too expensive are hereby avoided.

The processing device of the machine project can be a computer on which CAD software for the machine project is executed. The simulation model and/or the secondary simulation model can then be generated from the CAD software of the machine project, for example using the software industrialPhysics. For this purpose, the CAD software e.g. transfers its CAD data to industrialPhysics. A simulation of the secondary simulation model can accordingly be executed on the basis of the CAD data, whereby the industrial machine is simulated. The simulation of the secondary simulation model can be executed by the processing device of the machine project or by another processing device. The data of the secondary simulation model can then be partly or completely transferred to the drive control before the putting into operation of the industrial machine.

The simulation can then also be used for designing and/or selecting the motor by means of the secondary simulation model even before the putting into operation of the industrial machine.

More precisely, the processing device of the machine project and the drive control can be coupled by means of a data connection, in particular before or during the putting into operation of the machine (i.e. in an initialization phase). The drive control can then e.g. simulate the course of the movements of the drive motor (or of a plurality of drive motors) by means of a movement setpoint generator. For this purpose, the drive control can execute a sequence program, which controls the subsequent operation of the machine, and can output the respective angular positions, angular speeds and/or angular accelerations of the drive motor or of the drive motors at a large number of times by means of the movement setpoint generator. In this way, movement profiles can e.g. be readjusted by the movement setpoint generator without the drive motor actually being controlled.

The data on angular positions, angular speeds and/or angular accelerations determined by means of the movement setpoint generator at a large number of times are then fed into the secondary simulation model. The secondary simulation model thus not only has the CAD data, but also the movements to be expected in the operation of the machine. A complete simulation of the machine is then preferably carried out by means of the secondary simulation model.

The simulation of the movements of the components of the mechanical system is in particular carried out by means of the secondary simulation model, wherein the movement quantities (in other words: movement factors) obtained in this simulation and/or mechanical parameters obtained can be transferred to the drive control.

The drive control preferably generates one or more transfer functions of the mechanical system of the machine from the movement quantities. The simulation model of the drive control is therefore completed or generated based on the data of the simulation of the secondary simulation model.

A transfer function is preferably stored in the drive control in the form of a value table of value pairs, in particular in the library mentioned. The value pairs respectively indicate the movement quantity of a driving component and the associated movement quantity of a driven component. The value table of the value pairs of a mechanical component represents the transfer function of the component. The required movement quantities can be quickly determined in operation on the basis of the value pairs/transfer function. In addition, little memory space is used in the drive control by the value table. For example, the value table can comprise at least 20 value pairs or up to 36 value pairs or up to 500 or 2600 value pairs.

Alternatively, the secondary simulation model can be completely transferred to the drive control and can then be used by the drive control to carry out the simulation.

In an operating phase following the initialization phase, there is preferably no data connection between the drive control and the processing device of the machine project and/or the processing device which executes the secondary simulation model. Accordingly, the simulation model of the drive control and the secondary simulation model do not exchange any data. In the operating phase, the machine can carry out its regular operation and can e.g. actually carry out said sequence program.

In the operating phase, the drive control carries out the simulation of the machine by means of the simulation model and performs a feedforward control of the drive motor based on the results of the simulation, as described herein.

In accordance with a further advantageous embodiment, measurements of parameters of the components of the mechanical system are performed on the putting into operation and/or during the operation (i.e. in the operating phase) of the machine, whereupon the simulation model and/or the secondary simulation model is/are preferably updated with the measured parameters. The determined or measured parameters are e.g. to be understood as the above-mentioned movement quantities and/or mechanical parameters of the components of the mechanical system. A movement quantity, for example, indicates a speed, an acceleration or a position of a component of the mechanical system. A mechanical parameter is in particular to be understood as a torque, a force and/or a constant for calculating a torque or a force e.g. based on an acceleration or a speed.

A measurement of the torque delivered by the drive motor to the mechanical system and additionally a determination and/or a measurement of the respective angular position of the drive motor in particular take place. An angular acceleration and an angular speed of the drive motor can then be calculated from the angular position. In addition, the respective positions, speeds and accelerations of the remaining components of the mechanical system can be calculated from the angular position of the drive motor with the aid of the transfer functions of mechanical components. The forces and/or torques generated by the individual components can also be determined from the speeds, accelerations and positions of the components known in this manner with the aid of the measurement of the torque delivered by the drive motor to the mechanical system. Measurements can in particular be carried out repeatedly for this purpose. An equation system which e.g. comprises one equation per measurement is then set up on the basis of the physical relationships between movement quantities and mechanical parameters, taking into account the transfer functions of the mechanical components. The equation system preferably comprises the same number of or more equations than unknowns and can therefore be solved. This is described in detail in the European patent application EP 19180500.1 of the same applicant. The disclosure of the European patent application EP 19180500.1 is fully referenced here and is in particular included by reference in the present disclosure with respect to the calculation of the mechanical parameters of the mechanical system.

More precisely, the drive control can continuously carry out measurements of the parameters in the operating phase. The measured parameters can be stored in the drive control. It is possible to return to the initialization phase again after predetermined time intervals, in case of maintenance and/or on a change of at least one measured parameter by more than one tolerance value, i.e. the drive control can again be coupled to the processing device on which the secondary simulation runs. The measured and stored parameters can then be transferred to the machine project, whereupon the secondary simulation model is updated and/or improved based on the measured parameters. Subsequently, as described above, a simulation of the updated secondary simulation model can then be carried out again, wherein the transfer functions are updated in the drive control. In this way, the simulation model is therefore also updated in the drive control. It is then possible to transition to the operating phase again in which, as already stated, the drive control is decoupled from the secondary simulation model.

In accordance with a further advantageous embodiment, the simulation model is in each case updated after a predetermined time interval and/or after a predetermined event. As already indicated above, the simulation model can be updated after a predetermined number of operating hours, wherein measurements are e.g. performed at the machine after the predetermined number of operating hours in order to update the simulation model. The parameter values in accordance with the simulation model and the corresponding real measurement values can in particular be compared before the update of the parameter values and mechanical changes can be identified in this manner. Furthermore, a respective set of determined parameters can be stored and conclusions can be drawn from its time progression for future mechanical behavior, e.g. with respect to wear.

Said event can, for example, be a servicing, the replacement of a component and/or the removal or addition of mechanical components. In this respect, the simulation model can e.g. be correspondingly adapted without a measurement. It is likewise possible to carry out measurements in order to determine the effects of the event more precisely.

A further subject of the invention is an industrial machine comprising a drive motor, in particular an electric drive motor, a mechanical system having one or more components, and a drive control, wherein the drive control controls the drive motor and the drive motor drives the mechanical system. The industrial machine is characterized in that the drive control is configured to execute a simulation of the mechanical system of the machine by means of a simulation model and to perform a feedforward control of the drive motor based on the simulation.

The industrial machine can, for example, be configured to process workpieces and/or to sort and convey articles.

The statements made on the method in accordance with the invention apply accordingly to the industrial machine in accordance with the invention. This in particular applies with respect to advantages and preferred embodiments.

Figure 2:
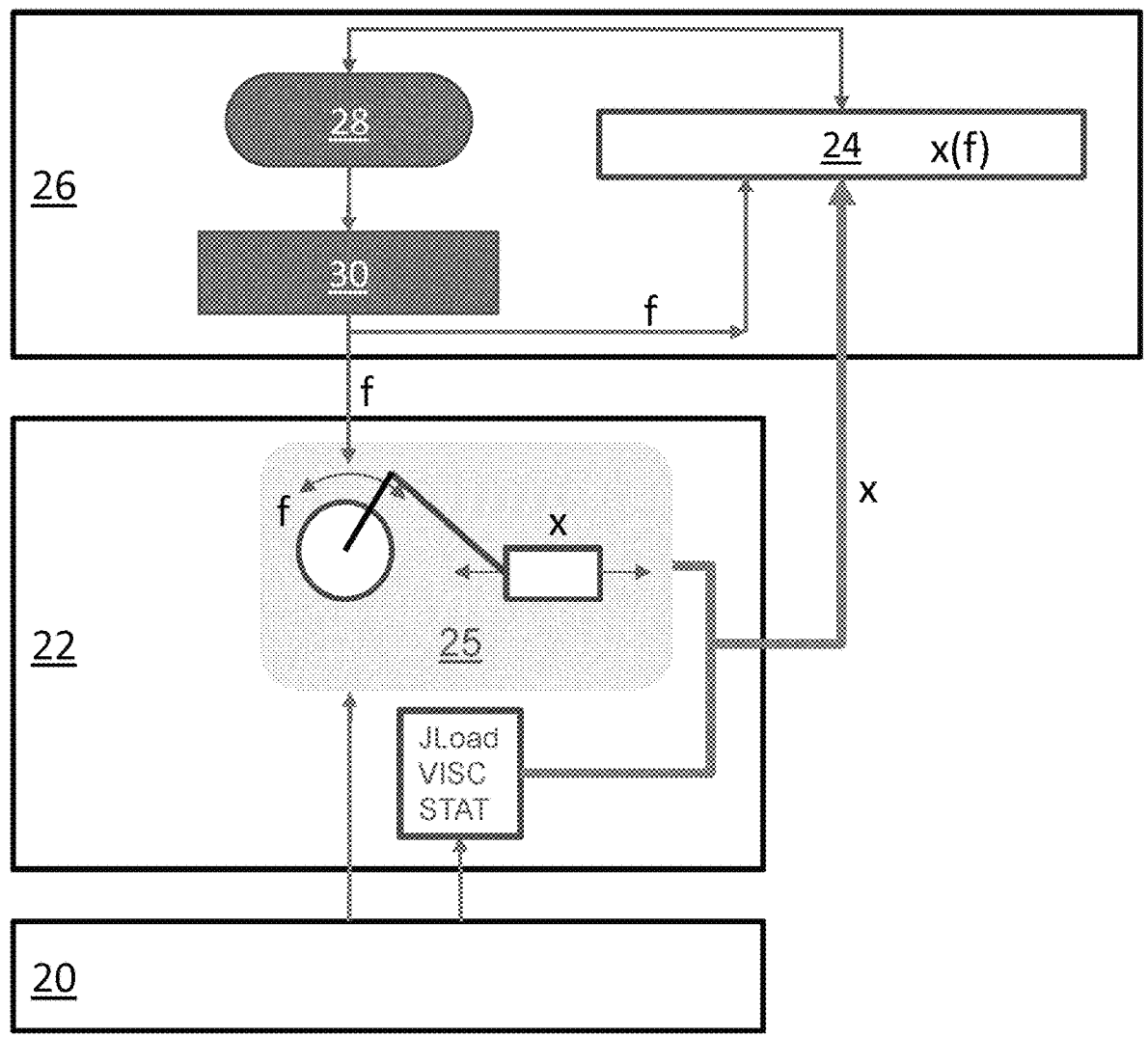

The invention will be described below purely by way of example with reference to the drawings. There are shown:

FIG. 1: the schematic design of a machine;

FIG. 2: schematically the creation of a simulation model; and

Figure 3:
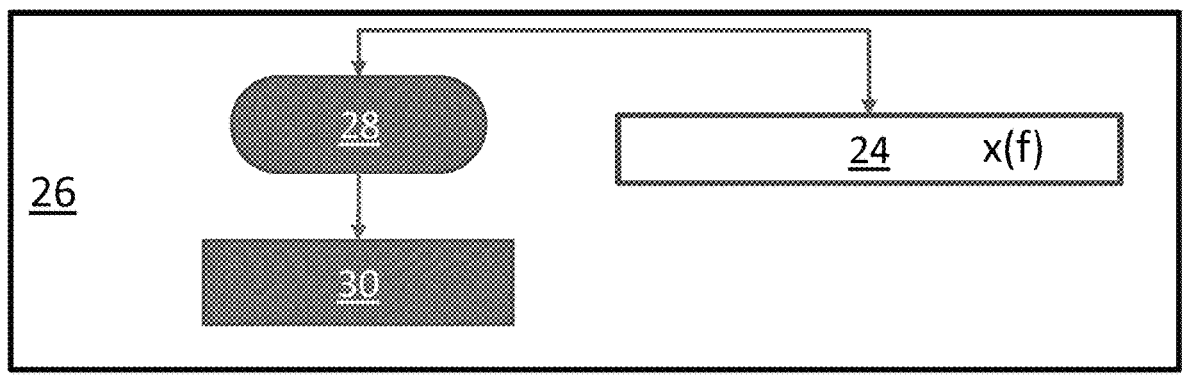

FIG. 3: schematically the use of the simulation model during the operation of the machine.

FIG. 1 shows a machine 10 in which a motor 12 moves a slide 14 to and fro. For this purpose, the motor 12 drives a crank 16 which in turn moves the slide 14 via a connecting rod 18. The motor 12 is controlled by a drive control 26 (see FIG. 2 and FIG. 3).

In this respect, the motor 12 together with the crank 16 is considered as the first component K1 and the slide 14 together with the connecting rod 18 is considered as the second component K2.

The design of the machine 10 shown here is purely exemplary and only serves to illustrate the creation of the simulation model. The simulation model can in this respect also be created for considerably more complex machines 10 having a plurality of components.

FIG. 2 shows the procedure for creating a simulation model, i.e. the initialization phase. For this purpose, a three-dimensional model of the machine 10 is generated by CAD software 20. The three-dimensional model is transferred to a simulation environment 22 (e.g. industrialPhysics).

In the simulation environment, a secondary simulation model 25 is first generated from the three-dimensional model.

The simulation environment 22 is linked to the drive control 26 in the initialization phase. In the initialization phase, the drive control 26 executes an execution program 28 by means of a movement setpoint generator (not shown). The movement setpoint generator repeatedly supplies the (simulated) angular position f of the drive axis of the motor 12 to the simulation environment 22. The simulation environment 22 calculates the respective position x of the slide 14 from the angular position f by means of the secondary simulation model 25.

The position x of the slide 14 is then transmitted to the drive control 26, wherein the drive control 26 generates a transfer function x(f) from the angular position f and from the position x of the slide, said transfer function x(f) then being part of a simulation model 24. The transfer function x(f) is stored as a value table having a large number of value pairs (f and x) in the drive control 26.

Mechanical parameters of the mechanical system of the machine 10 are additionally provided or calculated in the simulation environment 22. For example, the overall moment of inertia (Jload) to be overcome by the motor 12, the speed-dependent torque (VISC) to be overcome by the motor 12 and the static torque (STAT) to be overcome by the motor can be determined in this respect. The drive control 26 forms the simulation model 24 from the transfer function x(f) and from the determined or specified parameters. The data required for this purpose is transferred from the secondary simulation model 25 from the simulation environment 22 by means of a data line, for example.

The use of the simulation model 24 in operation is shown in FIG. 3. FIG. 3 therefore shows the operating phase. In the operation of the machine 10, there is no connection between the drive control 26 and the simulation environment 22, but the simulation model 24 is rather solely executed by the drive control 26. An execution program 28 accesses the simulation model 24 in this respect and carries out a simulation based on the simulation model 24. Based on the data obtained in the simulation, e.g. a torque to be applied/to be provided by the motor 12, the execution program 28 carries out a feedforward control 30 of the motor 12 to achieve an improved running behavior of the motor 12 in this manner.

In addition, the simulation model 24 and also the secondary simulation model 25 can still be updated and/or improved by measurements at the machine 10. For this purpose, the simulation environment 22 and the drive control 26 can be coupled to one another again, as shown in FIG. 2. The improvement and/or the update can also be performed in the drive control 26 itself. Alternatively or additionally, the improvement and/or the update can also take place in the simulation environment 22. For this purpose, the measurements can be transferred from the drive control 26 to the simulation environment 22, as shown by an arrow in FIG. 2.

REFERENCE NUMERAL LIST

10 machine
12 motor 14 slide
16 crank
18 connecting rod
20 CAD software
22 simulation environment
24 simulation model
25 secondary simulation model
26 drive control
28 execution program
30 feedforward control
K1 first component
K2 second component
f motor movement
x(f) transfer function

The invention claimed is:

1. A method of controlling a drive motor of an industrial machine, wherein a drive controller is configured to control the drive motor, and the drive motor drives a mechanical system having a plurality of coupled components, the method comprising:
performing, by the drive controller, a simulation of the mechanical system of the machine using a transfer function that is part of a simulation model, and performing a feedforward control of the drive motor based on results of the simulation,
wherein the transfer function describes behavior of at least some of the coupled components of the mechanical system, and
wherein the transfer function is a table relating values of a first variable describing a movement of a first component of the components of the mechanical system to values of a second variable describing a movement of a second component of the components of the mechanical system, said second component being coupled to the first component.

2. The method in accordance with claim 1, wherein the simulation model further comprises information on a structure of the mechanical system.

3. The method in accordance with claim 1, wherein the simulation model further comprises a representation of the plurality of coupled components of the mechanical system, and
the performing step further comprises repeatedly recalculating the representation.

4. The method in accordance with claim 1, wherein the simulation model used by the drive controller to perform the simulation is created based on a secondary simulation model and/or is supplied with data from the secondary simulation model.

5. The method in accordance with claim 4, wherein the secondary simulation model is generated outside the drive controller.

6. The method in accordance with claim 1, wherein the simulation model used by the drive controller to perform the simulation is created from a CAD model of the industrial machine.

7. The method in accordance with claim 1, wherein the performing step further comprises performing the simulation in real time during operation of the industrial machine.

8. The method in accordance with claim 1, wherein the performing step further comprises calculating, in the simulation, at least one of a force requirement and a torque requirement of the drive motor expected in real time.

9. The method in accordance with claim 1, wherein the performing step further comprises performing the simulation using a program code of the drive controller.

10. The method in accordance with claim 1, wherein the drive controller includes a head controller and a motor controller, with the simulation and the feedforward control being performed by the head controller.

11. The method in accordance with claim 1, further comprising selecting the drive motor by executing the simulation before putting the industrial machine into operation.

12. The method in accordance with claim 1, further comprising performing measurements of parameters of the coupled components of the mechanical system when putting the industrial machine into operation and/or during operation of the industrial machine, and updating the simulation model with the measured parameters.

13. The method in accordance with claim 1, further comprising updating the simulation model after a predetermined time interval and/or after a predetermined event.

14. The method in accordance with claim 1, wherein the transfer function relates one of a translational speed and a translational position of the first component to one of a rotational position and a rotational speed of the second component.

15. An industrial machine, comprising:
a drive motor;
a mechanical system having a plurality of coupled components; and
a drive controller configured to control the drive motor, wherein the drive motor drives the mechanical system,
wherein the drive controller is further configured to execute a simulation of the mechanical system of the industrial machine using a transfer function that is part of a simulation model, and perform feedforward control of the drive motor based on results of the simulation,
wherein the transfer function describes behavior of at least some of the coupled components of the mechanical system, and
wherein the transfer function is a table relating values of a first variable describing a movement of a first component of the components of the mechanical system to values of a second variable describing a movement of a second component of the components of the mechanical system, said second component being coupled to the first component.

16. The industrial machine of claim 15, wherein the drive motor is an electric drive motor.

* * * * *